United States Patent [19]
Ito et al.

[11] Patent Number: 5,693,993
[45] Date of Patent: Dec. 2, 1997

[54] ELECTRIC MOTOR WITH ROTATION DETECTING MECHANISM

[75] Inventors: Takeshi Ito; Satoru Sekiguchi; Masaru Kato, all of Yokohama, Japan

[73] Assignee: Jidosha Denki Kogyo Kabushiki Kaisha, Yokohama, Japan

[21] Appl. No.: 441,436

[22] Filed: May 15, 1995

[30] Foreign Application Priority Data

May 20, 1994 [JP] Japan ................................. 6-107142

[51] Int. Cl.⁶ .............................. H02K 11/00; G01B 7/14
[52] U.S. Cl. .................................. 310/68 B; 324/207.2
[58] Field of Search ..................... 324/207.2; 310/68 B, 310/68 R, 89

[56] References Cited

U.S. PATENT DOCUMENTS

| | | | |
|---|---|---|---|
| 4,410,853 | 10/1983 | Ikoma | 324/167 |
| 4,754,209 | 6/1988 | Mizuta | 318/673 |
| 4,935,652 | 6/1990 | Maxa | 310/68 B |
| 5,006,848 | 4/1991 | Fukumizu | 341/13 |
| 5,184,050 | 2/1993 | Harada et al. | 318/467 |
| 5,218,255 | 6/1993 | Horiguchi | 310/71 |
| 5,418,341 | 5/1995 | Sato | 200/11 R |
| 5,500,564 | 3/1996 | Sano et al. | 310/83 |

*Primary Examiner*—Steven L. Stephan
*Assistant Examiner*—Michael J. Wallace, Jr.
*Attorney, Agent, or Firm*—Sughrue, Mion, Zinn, Macpeak & Seas, PLLC

[57] ABSTRACT

An electric motor, which is housed with a pulse signal generator for generating a pulse signal according to rotation of an output shaft and the pulse signal generator is composed of a plate provided with a conductor plate having a plurality of conductive parts disposed annularly with predetermined spaces and a contactor to be a contacted slidingly with the conductive parts of the conductor plate.

19 Claims, 10 Drawing Sheets

ELECTRIC MOTOR WITH ROTATION DETECTING MECHANISM

BACKGROUND OF THE INVENTION

1. Field of the Invention

This invention relates to an electric motor, especially having a rotation detecting mechanism, used for, for example, a power window apparatus for controlling a window glass of a motor vehicle by detecting the position of the window glass indirectly on basis of a pulse signal generated from the rotation detecting mechanism housed in the electric motor.

2. Description of the Prior Art

Heretofore, as a motor of the power window apparatus for controlling the window glass of the motor vehicle by detecting indirectly the position of the window glass according to the pulse signal, a motor has been known which is provided with a disc-shaped magnetic plate rotating together with an output shaft and Hall elements disposed at two points slightly apart from the outer periphery of the magnetic plate.

When an armature of the motor rotates according to the power supply, a worm wheel rotates by meshing with a worm formed on an armature shaft of the armature and an output shaft secured to the worm wheel rotates, therefore a window glass mechanically connected to the output shaft through a linkage is actuated upwardly or downwardly in response to the current direction supplied to the motor.

As the magnetic plate is disposed on the worm wheel secured to the output shaft and the Hall elements disposed in the vicinity of the magnetic plate are connected to a controller of the power window apparatus, a pulse signal is generated on basis of Hall voltage caused from the Hall elements according to the rotation of the magnetic plate, whereby the controller detects the position of the window glass indirectly according to the number of pluses of the pulse signal and detects the window glass to be restrained according to disappearance of the pulse signal.

For example, when the window glass stops at the full-opened position or the full-closed position while the window glass is moving toward the full-opened position or the full-closed position, the controller of the power window apparatus recognizes the window glass to reach at the full-opened position or the full-closed position according to the disappearance of the pulse signal from the Hall elements caused by stopping of the output shaft of the motor and a counting value of a pulse counter indicating a count value corresponding to the full,opened position or the full-closed position, and cuts off the power supply to the motor.

Furthermore, if an arm or fingers of the passenger is caught between the window glass and the window frame while the window glass is moving toward the full-closed position, the controller recognize the window glass to pinch the passenger's arm or fingers according to the disappearance of the pulse signal from the Hall elements and the counting value of the pulse counter not indicating the count value corresponding to the full-closed position, and cuts off the power supply to the motor and supplies an current to the motor in the reverse direction, whereby the window glass returns in the opening direction and the ann or fingers is relieved from the window glass.

In the aforementioned conventional motor which is provided with the pulse generator composed of the magnetic plate disposed on the worm wheel secured to the output shaft of the motor and the Hall elements disposed slightly away from the magnetic plate in the non-contact state, it is necessary to decrease the distance between poles magnetized alternately in a circumferential direction of the magnetic plate and increase the number of the poles in order to improve the resolution of the pulse signal in the detection of the rotation. However, there is a limit in a technique for magnetizing the poles with tight clearance, accordingly there is a problem in that very high accuracy is required for disposing the Hall elements against the magnetic plate and the motor involves great difficulties in assembling. Furthermore, the face of the magnet plate may sway owing the rotation, in such a case, clearance between the magnetic plate and the Hall elements fluctuates and there is another problem in that the pulse signal generated from the Hall elements is not stabilized and there is the possibility that the pulse signal maybe misunderstood.

SUMMARY OF THE INVENTION

This invention is made in view of the aforementioned problems of the prior art, and it is an object to provide an electric motor which is possible to be assembled very easily, and provided with a pulse generator means excellent in the resolution and possible to detect the rotation of the output shaft securely.

The construction of the electric motor according to this invention in order to accomplish the above-mentioned object is characterized by comprising an armature rotating on an inner side of a magnet disposed on an inner peripheral face of a motor yoke according to power supply, an output shaft rotating according to transmission of the rotary power of the armature, and a pulse signal generator means disposed in a casing for generating a pulse signal according to the rotation of the output shaft, wherein the pulse signal generator means is composed of a plate provided with a conductor plate having conductive parts disposed annularly with predetermined spaces and a contactor disposed to be contacted slidingly with the conductive parts of the conductor plate. In the electric motor according to this invention, the plate may be secured to the output shaft and the contactor may be secured to the casing, and contrary to this, it is also possible to secure the plate and the contactor to the casing and the output shaft respectively.

In the electric motor according to another embodiment of this invention, the pulse signal generator means may generate two pulse signals having a phase difference equivalent to, for example, one-half of pulse width therebetween.

The conductor plate of the plate may be provided with a ring-shaped first conductive part, second conductive parts of predetermined angular widths, formed continuously from the first conductive part and disposed annularly with predetermined spaces, and third conductive parts of predetermined angular widths, formed continuously from the first and second conductive parts and disposed annularly with predetermined spaces at positions shifted from the second conductive parts as much as predetermined deflection angles, and the contactor may be provided with a first contact maker disposed to be contacted slidingly with the first conductive part of the conductor plate, a second contact maker isolated from the first contact maker and disposed to be contacted slidingly with the second conductive parts of the conductor plate, and a third contact maker isolated from the first and second contact makers and disposed to be contacted slidingly with the third conductive parts of the conductor plate in the other embodiment of the electric motor according to this invention. Furthermore, the conductor plate of the plate may be provided with a ring-shaped first conductive part, second conductive parts of predetermined angular widths, connected electrically with each other, isolated from the first conductive part and disposed annularly with predetermined spaces, and third conductive parts of predetermined angular widths, connected electrically with each other, isolated from the first and second conductive parts and disposed annularly with predetermined spaces at positions shifted from the second conductive parts as much as predetermined deflection angles, and the contactor may be provided with a first contact maker disposed to be contacted slidingly with the first conductive part of the conductor plate, a second contact maker connected electrically with the first contact maker and disposed to be contacted slidingly with the second conductive parts of the conductor plate, and a third contact maker connected electrically with the first and second contact makers and disposed to be contacted slidingly with the third conductive parts of the conductor plate in the other embodiment of the electric motor according to this invention. In the electric motor according to this invention, the plate of the pulse generator means may be formed of a disc-shaped print base made of insulating resin and the conductor plate disposed on the print base together with a non-conductive resist layer, and formed with an osculating plane having a smooth face to be contacted slidingly with the contactor. Additionally the plate of the pulse generator means may be also formed from insulating resin together with the conductor plate through insert moulding process and formed with an osculating plane having a smooth face to be contacted slidingly with the contactor.

In the electric motor according to this invention, the pulse generator means is composed of the plate secured to the output shaft or the casing and the contactor secured to the casing or the output shaft respectively, and so designed as to generate the pulse signal on basis of the contact between the contactor and the conductor plate of the plate. Therefore, the pulse signal is not influenced by the sway of the osculating plane of the plate as compared with the conventional pulse generator of non-contact type, so that the pulse signal is stabilized and the rotation of the output shaft is detected very accurately. The resolution of the pulse signal is improved by decreasing the distance between the conductive parts of the conductor plate and it is not so difficult to decrease the distance between the conductive parts as compared with the conventional magnetic plate having the magnetized poles. Additionally, the electric motor according to this invention is assembled without difficulty since the high accuracy is not required for disposing the plate and the contactor as compared with the conventional electric motor having the pulse generator composed of the magnetic plate and the Hall elements.

In the electric motor according to the other embodiment of this invention, the pulse signal generator means is composed of the plate having the conductor plate provided with, for example, a first conductive part, second conductive parts and third conductive parts, and the contactor provided with a first contact maker to be contacted with the first conductive part, a second contact maker to be contacted with the second conductive parts and a third contact maker to be contacted with the third conductive parts of the conductor plate so as to generate two pulse signals having a phase difference equivalent to, for example, one-half of pulse width therebetween. Therefore, the rotational direction of the output shaft is detected on basis of the order of two pulse signals.

Furthermore, in the electric motor according to the other embodiment of this invention, the plate of the pulse signal generator means is formed with the osculating plane having a smooth face to be contacted slidingly with the contactor through the printing method or the insert moulding method. Therefore, the plate with high-accurate dimensions is obtained and the resolution of the pulse signal is improved. Additionally, the contactor of the pulse signal generator means is hard to be worm since there are not irregularties on the osculating plane of the plate, and the pulse signal is not influenced even if the contactor is worm in some degree because there is not a difference in level between the conductor plate and the insulating resin on the osculating plane of the plate.

DESCRIPTION OF THE PREFERRED EMBODIMENT

Figure 1:
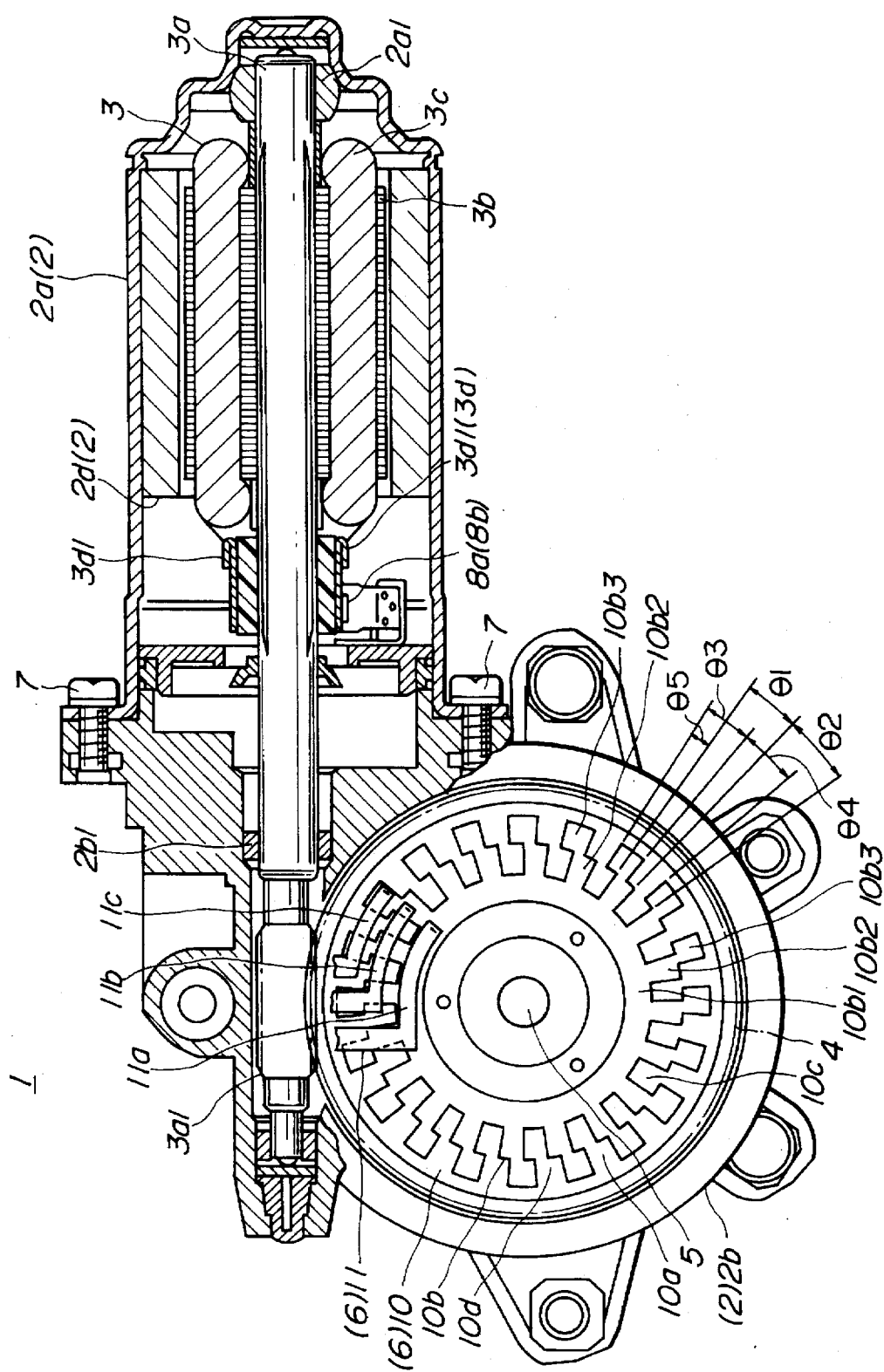
FIG. 1 is a partially sectional front view illustrating the first embodiment of an electric motor according to this invention.
Figure 2:
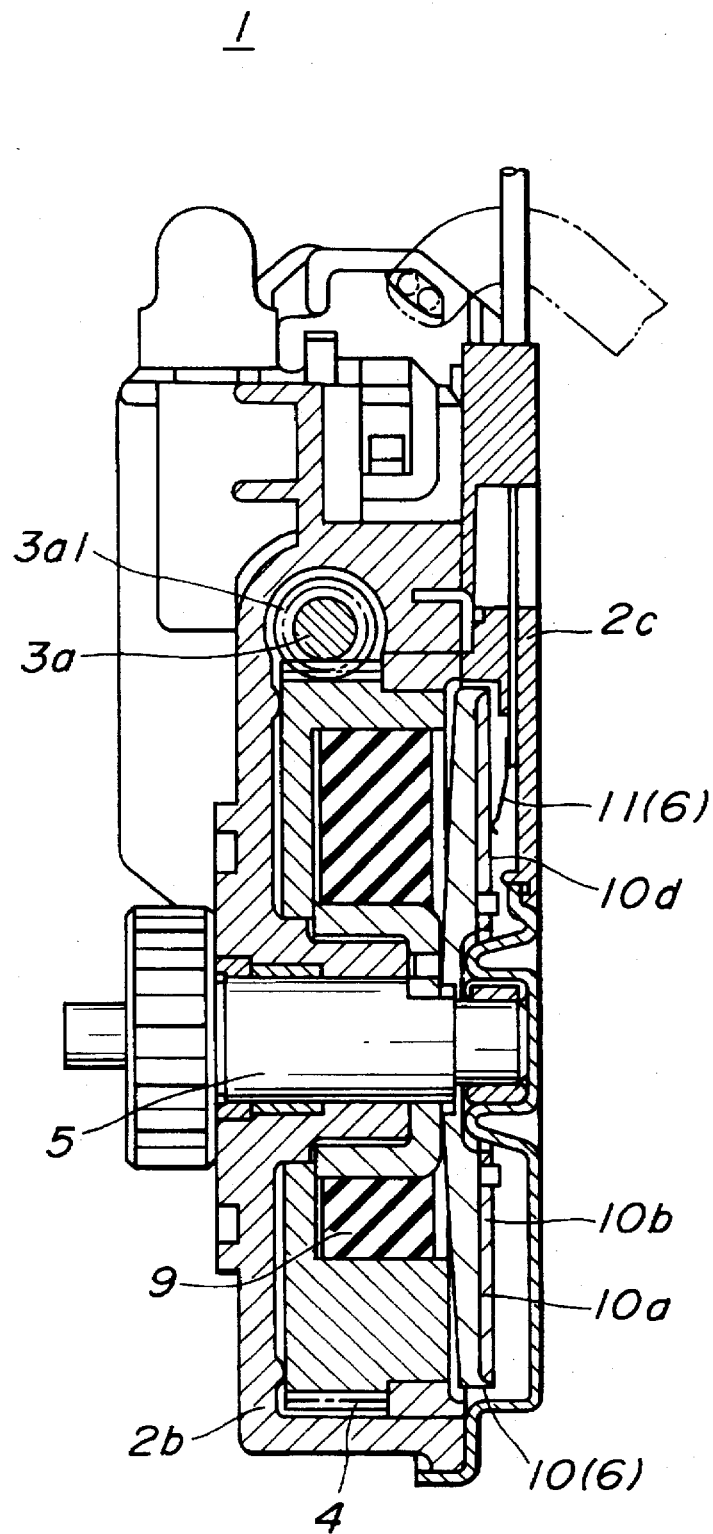
FIG. 2 is a vertical sectional view of the electric motor shown in FIG. 1.

An embodiment of the electric motor according to this invention will be explained below on basis of FIG. 1 to FIG. 7.

An electric motor 1 is mainly constructed from a casing 2, an armature 3, a worm wheel 4, an output shaft 5 and a pulse generator 6.

The casing 2 is composed of a motor casing (yoke) 2a, a gear casing 2b and a gear cover 2c, the gear casing 2b is secured to the opening end of the motor casing 2a by screwing screws 7, and an opening part of the gear casing 2b is covered with the gear cover 2c fitted to the gear casing 2b. The motor 1 is provided with two semi-cylindrical shaped magnets 2d on an inner peripheral face of the motor casing 2a, and disposed with the armature 3 on an inner side of the magnets 2d.

The armature 3 is fixed with an armature core 3b on an armature shaft 3a at a position corresponding to the magnets 2d, and an armature coil 3c is wound around the armature core 3b. The armature coil 3c is connected to a commutator piece 3d1 of a commutator 3c fixed on the armature shaft 3a at a position close to the armature core 3b. The armature shaft 3a is supported rotatably by a bearing 2a1 secured on the right side of the motor casing 2a shown in FIG. 1 and a bearing 2b1 fitted in the gear casing 2b, and rotates according to power supply through two brushes 8a and 8b disposed to be contacted with the commutator 3d.

The armature shaft 3a is formed with a worm 3a1, which is meshed with the worm wheel 4. The worm wheel 4 is connected with the output shaft 5 supported rotatably by the gear casing 2b through an elastic damper 9, and the rotary power of the armature 3 is transmitted to the output shaft 5 through the worm 3a1, the worm wheel 4 and the damper 9.

The pulse signal generator 6 is disposed between the worm wheel 4 and the gear cover 2c, which is composed of a plate 10 secured on the worm wheel 4 and a contactor 11 secured to the gear cover 2c.

Figure 3:
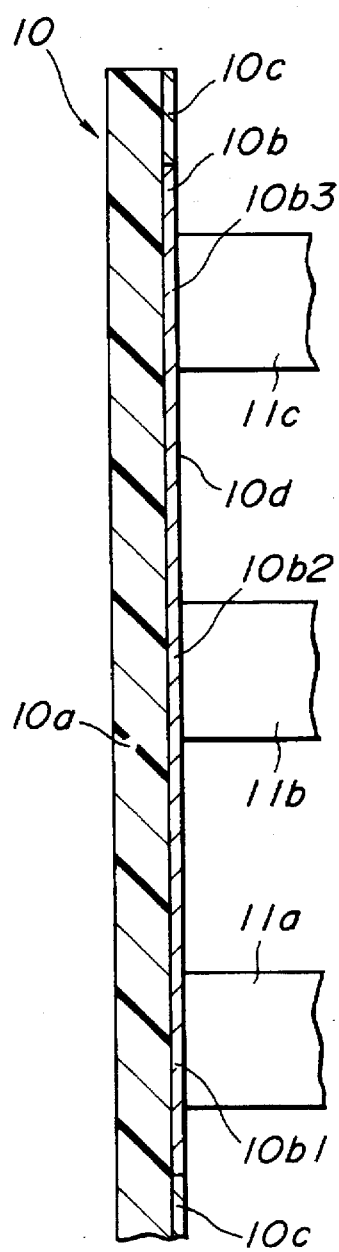
FIG. 3 is a sectional view illustrating a plate of the electric motor shown in FIG. 1.

The plate 10 is formed of a disc-shaped print base 10a and a conductor plate 10b made of a thin-copper sheet and disposed on the print base 10a, and the conductor plate 10b consists of a first conductive part 10b1, second conductive parts 10b2 and third conductive parts 10b3 as also shown in FIG. 3.

The first conductive part 10b1 of the conductor plate 10b is formed in a ring shape on the print base 10a.

The second conductive parts 10b2 are formed continuously and radiately from the circumference of the ring-shaped first conductive part 10b1 as shown in FIG. 1. The second conductive parts 10b2 have predetermined angular widths θ1 of 9 deg, and 20 pieces of the second conductive parts 10b2 are disposed annularly with predetermined equal spaces θ2 of 9 deg in this embodiment.

The third conductive parts 10b3 are formed continuously are radiately from the outer side of the respective second conductive parts 10b2. The third conductive parts 10b3 have predetermined angular widths θ3 of 9 deg, and 20 pieces of the third conductive parts 10b3 are disposed annularly with predetermined equal spaces θ4 of 9 deg similarly to the second conductive parts 10b2 at positions shifted from the respective second conductive parts 10b2 as much as Predetermined deflection angles θ5 of 4.5 deg.

Although the plate 10 is disposed with 20 pieces of the respective second and third conductive parts 10b2 and 10b3 on the print base 10a so as to generate 20 pulses for every rotation of the output shaft 5, it is also possible to increase the number of pulses by increasing the number of the second and third conductive parts 10b2 and 10b3 according to demand. For example, it is possible to generate 40 pulses for every rotation of the output shaft 5 by setting the angular widths θ1, θ3 and the spaces θ2, θ4 into 4.5 deg (in this case, θ5=2.25 deg).

The contactor plate 10b of the plate 10 is formed through etching treatment, the spaces formed between the respective second conductive parts 10b2 or third conductive parts 10b3 are filled with non-conductive resin and a resist layer 10c is formed therebetween. Whereby, the respective conductive parts 10b1, 10b2 and 10b3 form a uniform and even osculating plane 10d on the plate 10 together with the resist layer 10c. The osculating plane 10d is to be contacted with the contactor 11.

The contactor 11 is provided with a first contact maker 11a disposed to be contacted slidingly with the first conductive part 10b1, a second contact maker 11b isolated from the first contact maker 11a and disposed to be contacted slidingly with the second conductive parts 10b2, and a third contact maker 11c isolated from the first and the second contact makers 11a, 11b and disposed to be contacted slidingly with the third conductive parts 10b3.

The first contact maker 11a, the second contact maker 11b and the third contact maker 11c of the contactor 11 are made of conductive resilient material. The respective contact makers 11a, 11b and 11c are secured independently to the gear cover 2c and arranged in a radial direction of the plate 10 so as to be pressed against the osculating plane 10d of the plate 10 by the respective elastic force.

The first contact maker 11a, the second contact maker 11b and the third contact maker 11c are connected respectively to a first terminal 12, a second terminal 13 and a third terminal 14 which are disposed to the Sear casing 2b.

In the electric motor 1 having the aforementioned structure, when the output shaft 5 rotates on basis of the rotation of the armature 3, the second contact maker 10b intermittently repeats contact with the second conductive parts 10b2 on the osculating plane 10d of the plate 10 according to the rotation of the plate 10. Accordingly, an electric current flows intermittently between the second contact maker 11b and the first contact maker 11a in contact with the first conductive part 10b1 always by impressing voltage between the contact makers 11a and 11b, thereby generating a first pulse signal between the first and the second contact makers 11a and 11b of the contactor 11. Similarly, the third contact maker 11c repeats contact with the third conductive parts 10b3 intermittently according to the rotation of the plate 10, therefore a second pulse signal is generated between the first and the second contact makers 11a and 11c by impressing voltage between the contact makers 11a and 11c. In this case, there is a phase difference equivalent to one-half of the pulse width between the first pulse signal generated through the second contact maker 11b and the second pulse signal generated through the third contact maker 11c according to the deflection angles θ5 of 4.5 deg existing between the second and the third conductive parts 10b2 and 10b3 on the osculating plane 10d of the plate 10.

Figure 4:
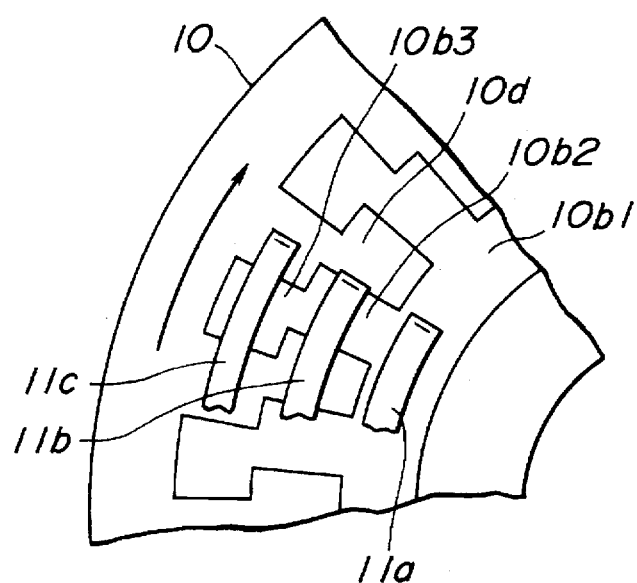
FIGS. 4 and 5 are schematic illustrations showing contact between a contactor and conductive parts of the plate in the electric motor shown in FIG. 1.

Namely, when the plate 10 rotates in the clockwise direction (forward rotation) together with the output shaft 5 as shown in FIG. 4, the second contact maker 11b is contacted with the second conductive parts 10b2 and separates from the second conductive parts 10b2 always before the third contact maker 11c is contacted with the third conductive parts 10b3 and separates from the third conductive parts 10b3 of the conductor plate 10b, accordingly a delay of pulse phase is always observed as much as one-half of the pulse width in the second pulse signal generated through the third contact maker 11c against the first pulse signal generated through the second contact maker 11b.

Figure 5:
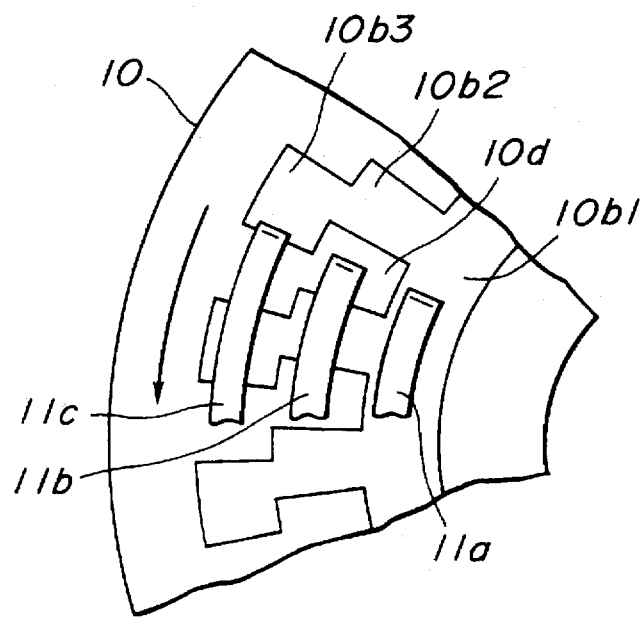

Contrary to this, when the plate 10 rotates in the anti-clockwise direction (reverse rotation) as shown in FIG. 5, the third contact maker 11c is contacted with the third conductive parts 10b3 and separates from the third conductive parts 10b3 always before the second contact maker 11b is contacted with the second conductive parts 10b2 and separates from the second conductive parts 10b2, accordingly the delay of pulse phase is always observed as much as one-half of the pulse width in the first pulse signal generated through the second contact maker 11b against the second pulse signal generated through the third contact maker 11c.

Accordingly, it is possible to decide the rotational direction of the plate 10, i.e. the output shaft 5 by detecting the delay of pulse phase in the first pulse signal or the second pulse signal.

In this time, the first contact maker 11a, the second contact maker 11b and the third contact maker 11c of the contactor 11 are contacted securely with the osculating plane 10d of the plate 10 by the elastic force of the respective contact makers even if the osculating plane 10d sways according to the rotation of the plate 10, therefore it is possible to obtain the stabilized pulse signals through the second and the third contact makers 11b and 11c independently of the sway of the plate 10 and possible to detect the rotation of the output shaft 5 without misunderstanding.

Furthermore, the first conductive part 10b1, the second conductive parts 10b2, the third conductive parts 10b3 and the resist layer 10c are formed with the smooth and even surfaces on the osculating plane 10d of the plate 10. Accordingly, it is possible to reduce an undesired sound and abrasion of the contact makers 11a, 11b, 11c of the contactor 11 caused by the sliding contact between the contactor makers and the osculating plane 10d of the plate. In addition to above, there is not very much change in the contact period of the contact makers with the respective conductive parts even if the contact makers are worn for a long time since the osculating plane 10d of the plate 10 is formed so as not to have a difference in level between the respective conductive parts and the resist layer 10c, therefore the duty cycle of the pulse signal generated from the pulse signal generator 6 is not influenced very much by the abrasion of the contact makers of the contactor 11.

Figure 6:
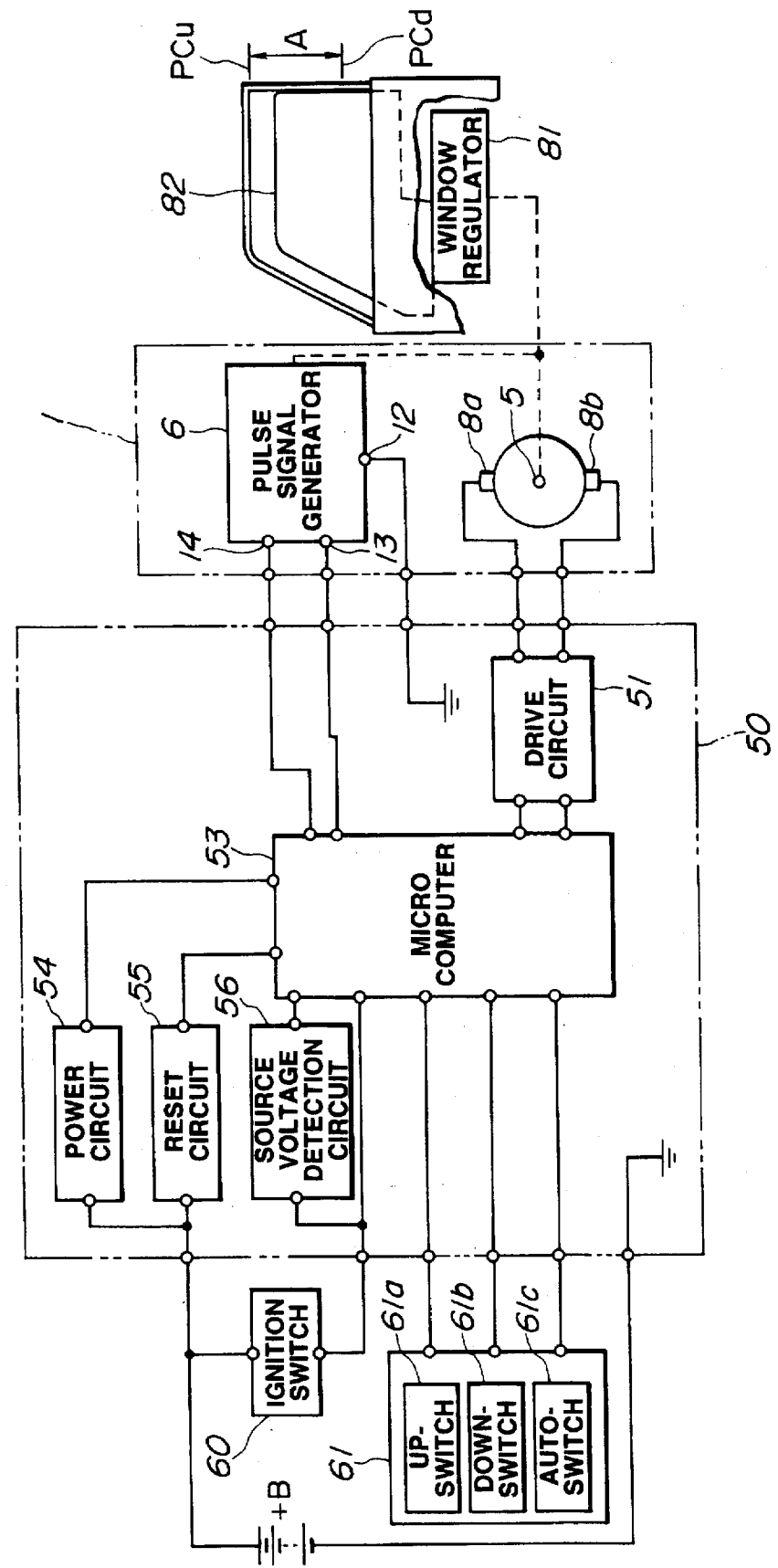
FIG. 6 is a schematic circuit diagram illustrating an example of a power window apparatus using the electric motor shown in FIG. 1.

The electric motor 1 is applied to a power window apparatus 80 shown in FIG. 6, for example.

The power window apparatus 80 consists mainly of a controller 50, a window switch 61, a window regulator 81 and so on, the output shaft 5 of the electric motor is connected mechanically with the window glass 82 through the window regulator 81 and the brushes 8a and 8b are connected to a drive circuit 51 in the controller 50. The first contact maker 11a of the pulse signal generator 6 is grounded through the first terminal 12, and the second and the third contact makers 11b and 11c are connected to a microcomputer 53 of the controller 50 through the second and the third terminals 13 and 14, whereby the pulse signals generated from the second and the third contact maker 11b and 11c of the pulse signal generator 6 are inputted into the microcomputer 53 of the controller 50.

The controller 50 is provided with a power circuit 54, a reset circuit 55 and a source voltage detection circuit 56, and the controller 50 is connected with a power source +B through an ignition switch 60 and connected with the window switch 61 having an up-switch 61a, a down-switch 61b and an auto-switch 61c.

When the pulse signals are generated from the pulse signal generator 6 according to the rotation of the output shafts 5 of the motor 1, the controller 50 decides the rotational direction of the output shaft 5 on basis of the delay of pulse phase between the first pulse signal generated through the second contact maker 11b (second terminal 13) and the second pulse signal generated through the third contact maker 11c (third terminal 14) of the contactor 11. Namely, the controller 50 determines that the output shaft 5 of the motor 1 rotates in the forward direction (clockwise direction as shown in FIG. 4) if the second pulse signal generated through the third contact maker 11c is H-level when a negative going edge (change of the pulse signal from H-level into L-level) is detected in the first pulse signal generated through the second contact maker 11b, and determines that the output shaft 5 rotates in the reverse direction (anticlockwise direction as shown in FIG. 5) if the second pulse signal generated through the third contact maker 11c is L-level when the negative going edge is detected in the first pulse signal generated through the second contact maker 11b of the contactor 11.

Furthermore, the controller 50 counts the number of pulses and detects the present position of the window glass 82 indirectly on basis of the counting value, and compares pulse period Tp with predetermined reference period Tref at all times and detects the window glass 82 to be restrained if the pulse period. Tp becomes larger than prediction time Tref calculated in advance.

In the power window apparatus 80, turning area A is predetermined at a range between a point slightly lower than the full-closed position of the window glass 82 corresponding to first reference count value PCu and a point slightly higher than the full-opened position of the window glass 82 corresponding second reference count value PCd, as an area where there is the possibility that passenger's fingers or arm may be caught between the window glass 82 and the window frame as shown in FIG. 6. The controller 50 is so designed as to return the window glass 82 in the opening direction by deciding the fingers or arm to be caught if the upward motion of the window glass 82 is restrained within the turning area A.

An explanation will be given below concerning the control in the power window apparatus 80 on basis of FIG. 7.

If the down-switch 61b of the window switch 61 is switched on when the window glass 82 arrives to the full-closed position for example, decision is done to be "NO" at step 30 and the control proceeds to step 32 after decision is done to be "NO" at step 31. After deciding the up-switch 61b not to be operated (NO) at step 32, the down-switch 61 is decided to be switched on (YES) at step 33 and the control proceeds to step 34. At step 34, an electric current is supplied to the motor 1 in order to rotate the output shaft 5 of the motor 1 in the forward direction.

When the output shaft 5 of the motor 1 rotates in the forward direction according to the current supply,the window glass 82 moves toward the full-opened position through the window regulator 81. The plate 10 rotates forwardly together with the output shaft 5 of the motor 1, the second contact maker 11b of the contactor 11 intermittently repeats the contact with the second contactive parts 10b2 on the osculating plane 10d and the third contact maker 11c also repeats intermittently the contact with the third contactive parts 10b3 of the conductor plate 10b, whereby the pulse signal generator 6 generates the first and the second pulse signals. In this time, the controller 50 recognizes that the window glass 82 is moving in the opening direction according to the forward rotation of the output shaft 5 by detecting the H-level voltage in the second pulse signal generated through the third contact maker 11c (third terminal 14) when the negative going edge is detected in the first pulse signal generated through the second contact maker 11b (second terminal 13).

The control proceeds to step 35 and further proceeds to step 37 after deciding the pulse signal to be generated (YES) at the step 35. The control returns to step 30 after renewing counting value PC of the number of the pulse signals at step 37, calculating the pulse period Tp at step 38, and calculating the time Tref on basis of the obtained pulse period Tp at step 39.

The aforementioned control routine is repeated while the down-switch 61b is being operated on, thereby driving the window glass 82 toward the full-opened position. When the window glass 82 arrives to the full-opened position, the window glass 82 is obstructed to move and the rotation of the output shaft 5 of the motor 1 is restrained so that the pulse signals from the pulse signal generator 6 disappear. Therefore, decision is done to be "NO" at step 35 and the control proceeds to step 36. The control proceeds to step 40 after the time Tref obtained at step 39 and decision is done at step 41 after deciding to be "NO" at the step 40. Then, the power supply to the motor 1 is interrupted at step 42 after predetermined time TL, thereby stopping the rotation of the output shaft 5 of the motor 1, and the window glass 82 is stopped at the full-opened position.

If the up-switch 61a of the window switch 61 is operated on when the window glass 82 is in the full-opened position for example, decision is done to be "NO" at step 30 and the control proceeds to step 32 after decision is done to be "NO" at step 31. By deciding the up-switch 61a to be switched on (YES) at step 32, the control proceeds step 46, and an electric current is supplied to the motor 1 through the drive circuit 51 so as to rotate the output shaft 5 of the motor 1 in the reverse direction at the step 46.

According to the reverse rotation of the output shaft 5 of the motor 1 caused by the current supply, the window glass 82 moves toward the full-closed position through the window regulator 81. The plate 10 also rotates reversely according to the reverse rotation of the output shaft 5 of the motor 1, and the pulse signal generator 6 generates the first and the second pulse signal according to the repetition of the contact and the separation of the second and the third contact maker 11b and 11c of the contactor 11 against the second and the third conductive parts 10b2 and 10b3 of the conductor plate 10b. In this time, the controller 50 recognized that the window glass 82 is moving in the closing direction according to the reverse rotation of the output shaft 5 by detecting the L-level voltage in the second pulse signal generated through the third contact maker 11c (third terminal 14) when the negative going edge is detected in the first pulse signal generated through the second contact maker 11b (second terminal 13).

The control 1 proceeds to step 35 and further proceeds to steps 37, 38 and 39 after deciding the pulse signal to be generated (YES) at the step 35. The control returns to step 30 after excecuting the steps 37, 38 and 39 in the same manner as the aforementioned manual opening action.

The above-mentioned control routine is repeated while the up-switch 61a is being switched on, thereby driving the window glass 82 toward the full-closed position. When the window glass 82 arrives to the full-closed position by passing through the turning area A, the window glass 82 is obstructed to move and the rotation of the output shaft 5 is restrained, whereby the pulse signals generated from the pulse signal generator 6 disappear. Accordingly, decision is done at step 35 to be "NO" and the control proceeds to step 36. The control proceeds to step 40 after the time expiration Tref calculated at step 39 and further proceeds to step 47 after deciding to be "YES" at the step 40. At step 47, decision is done to be "NO" since the counting value PC of pulses is smaller than the first reference count value PCu (the window glass 82 is not located in the turning area A) and the control proceeds to step 41. After the predetermined time expiration TL at step 41, the power supply to the motor 1 is interrupted through the drive circuit 51 in the controller 50 at step 42, thereby stopping rotation of the output shaft 5 of the motor 1 and the window glass 82 is stopped at the full-closed position.

If the passenger's fingers or arm is caught between the window glass 82 and the window frame in the turning area A when the window glass 82 is moving in the closing direction, the window glass 82 is obstructed to move and the rotation of the output shaft 5 is restrained, whereby the pulse signals from the pulse signal generator 6 become extinct. Therefore, decision is done to be "NO" at step 35 and the control proceeds to step 36. The control proceeds to step 40 after the time expiration of Tref since the pulse signals disappear and further proceeds to step 47 after deciding to be "YES" at step 40. At step 47, decision is done to be "YES" because the window glass 82 is in the turning area A and the counting value PC indicates an intermediate value between the first and the second reference count values PCu and PCd, so that the control proceeds to step 48. At step 48, the electric current is supplied to the motor 1 so as to rotate the output shaft 5 in the forward direction and to drive the window glass 82 in the opening direction by reversely actuating the drive circuit 51, and the control proceeds to step 41.

At step 42, the power supply to the motor 1 is interrupted through the drive circuit 51 after the predetermined time expiration of TL of step 41, whereby the window glass 82 is stopped at the position sufficiently lower than the point of catching the passenger's fingers or arm. Accordingly, the fingers, arm or the like of the passenger is never damaged.

On-operation of the up-switch 61a or the down switch 61b is interrupted, the control proceeds to step 29 through steps 30, 31, 32 and 33, and the window glass 82 is stopped immediately at the present position by cutting off the power supply to the motor 1 at step 29.

If the down-switch 61b is switched on after an on-operation of the auto-switch 61c of the window switch 61 when the window glass 82 is not in the full-opened position, the control proceeds to step 45 through steps 30, 43 and 44. Then the electric current is supplied to the motor 1 through the driving circuit 51 so as to rotate the output shaft 5 of the motor 1 in the forward direction at step 45, thereby driving the window glass 82 in the opening direction. Similarly, if the up-switch 61a is switched on after the on-operation of the auto-switch 61c of the window switch 61 when the window glass 82 is not in the full-closed position, the control proceeds to step 49 through steps 30 and 43. At step 49, the electric current is supplied to the motor 1 through the driving circuit 51 so as to rotate the output shaft 5 of the motor 1 in the reverse direction at step 49, thereby driving the window glass 82 in the closing direction.

The aforementioned automatic action is continued until the pulse signals from the pulse signal generator 6 disappear at step 35 even after the on-operations of the switches 61a, 61b and 61c are interrupted because the control routine is repeated through steps 30, 31, 35, 37, 38 and 39.

Figure 8:
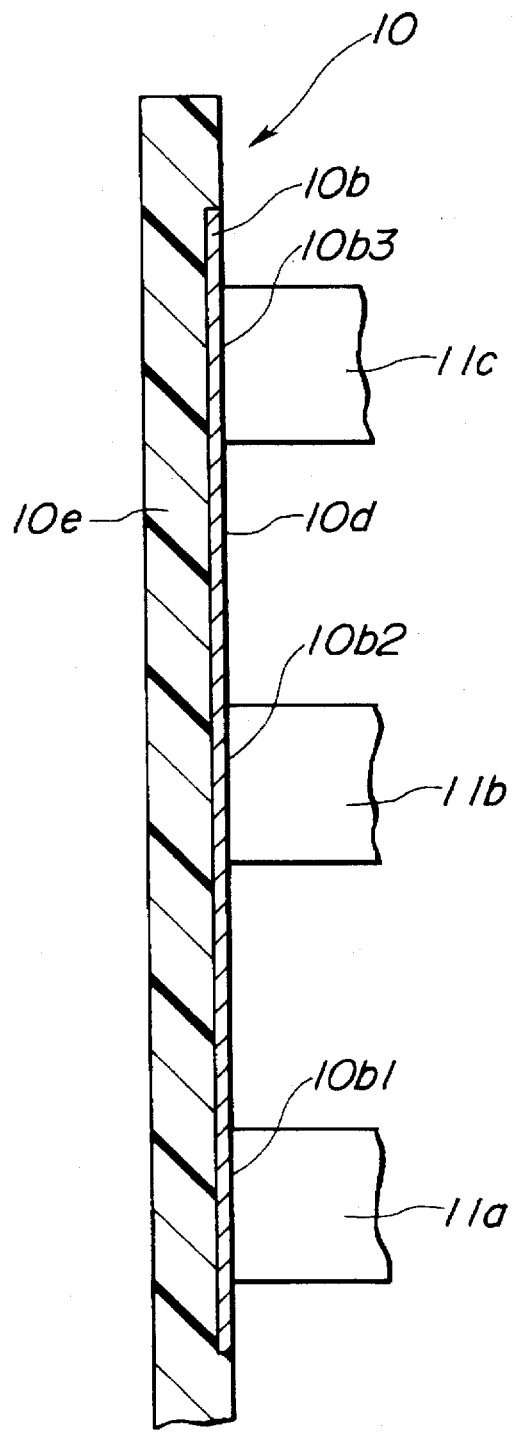
FIG. 8 is a sectional view illustrating another example of the plate of the electric motor according to this invention.

The plate 10 of the pulse signal generator 6 housed in the aforementioned electric motor 1 is also possible to be formed through the insert moulding process as shown in FIG. 8.

In this case, a conductor plate 10b of the plate 10 has configuration similar to the aforementioned embodiment and is composed of a first conductive part 10b1, a second conductive parts 10b2, and a third conductive parts 10b3, which are formed in one body together with a circular plate 10e made of insulating resin through the insert moulding process, and the plate 10 is formed with a osculating plane 10d having a smooth face.

The contact makers 11a, 11b and 11c of the contactor 11 are contacted with the osculating plane 10d of the plate 10 according to the respective electric force, and there is not a difference in level between the conductive parts 10b1, 10b2 and 10b3 on the osculating plane 10d, therefore the contact makers 11a, 11b and 11c are contacted securely with the osculating plane 10d even if the osculating plane 10d sways according to the rotation of plate 10 together with the output shaft 5.

Another embodiment of the electric motor according to this invention will be described below on basis of FIG. 9 to FIG. 13.

Figure 10:
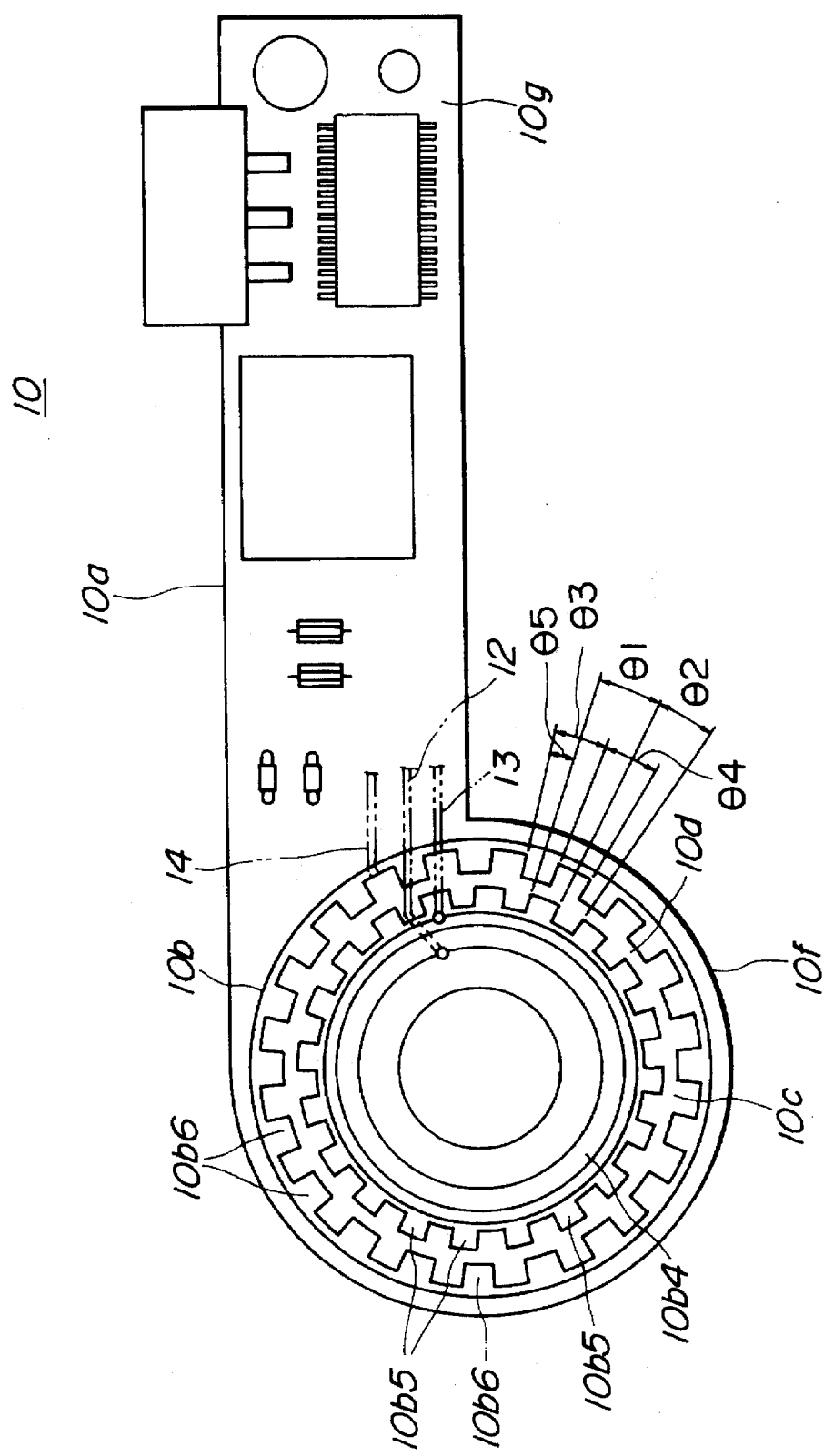
FIG. 10 is a plan view illustrating a plate of the electric motor shown in FIG. 9.

In this embodiment, a conductor plate 10b of a plate 10 in the pulse signal generator 6 is made of thin-copper sheet and composed of a first conductive part 10b4, a second conductive parts 10b5 and the third conductive parts 10b6 as shown in FIG. 10.

Figure 11:
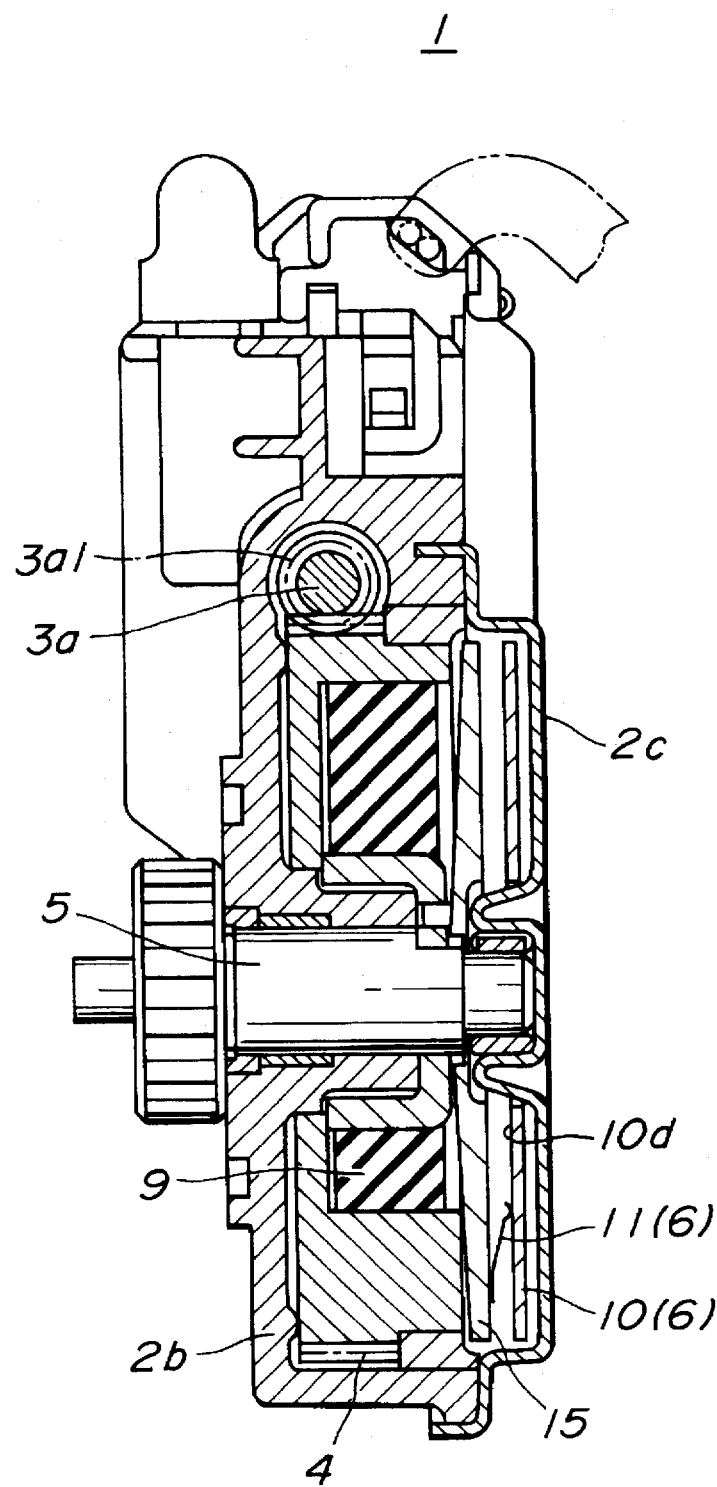
FIG. 11 is a vertical sectional view of the electric motor shown in FIG. 9.

The conductor plate 10b having the respective conductive parts 10b4, 10b5 and 10b6 is disposed on a circular portion 10f of a print base 10a made of insulating material and formed with the circular portion 10f and a rectangular portion 10g as shown in FIG. 10. The print base 10a is mounted with electronic devices forming the controller 50 shown in FIG. 6 on the rectangular portion 10g. The plate 10 is disposed to the gear casing 2c on the side of the worm wheel 4 as shown in FIG. 11.

The first conductive part 10b4 of the conductor plate 10b is formed in a ring shape at a position near to the center of the circular portion 10f of the print base 10a as shown in FIG. 10.

The second conductive parts 10b5 of the conductor plate 10b have predetermined angular widths θ1 of 9 deg, and 20 pieces of the second conductive parts 10b5 are disposed annularly with predetermined spaces θ2 of 9 deg on the outside of the first conductive part 10b4.

The second conductive parts 10b5 are isolated from the first conductive part 10b4 and connected electrically with each other on the center sides thereof.

The third conductive parts 10b6 of the conductor plate 10b have predetermined angular widths θ3 of 9 deg, and 20 pieces of the third conductive parts 10b6 are disposed annularly with predetermined spaces θ4 of 9 deg similarly to the second conductive parts 10b5 at positions shifted from the respective second conductive parts 10b5 as much as predetermined deflection angles θ5 of 4.5 deg on the outside of the second conductive parts 10b5. The third conductive parts 10b6 are isolated from the first and second conductive parts 10b4 and 10b5, and connected electrically with each other on the outer sides thereof.

The first conductive part 10b4, the second conductive parts 10b5 and the third conductive parts 10b6 are connected to a first terminal 12, a second terminal 13 and a third terminal 14, respectively.

Although the plate 10 is disposed with 20 pieces of the respective second and third conductive parts 10b5 and 10b6 on the circular portion 10f of the print base 10a so as to generate 20 pulses for every rotation of the output shaft 5 in this embodiment similarly to the aforementioned embodiment, it is possible to increase the number of pulses by increasing the number of the second and third conductive parts 10b5 and 10b6 if necessary.

The contactor plate 10b of the plate 10 is formed with the respective conductive parts 10b4, 10b5 and 10b6 through the etching treatment, the spaces formed among the first conductive part 10b4, the second conductive parts 10b5 and the third conductive parts 10b6 are filled with non-conductive resin and a resist layer 10c is formed on the circular portion 10f of the print base 10a. Whereby, the respective conductive parts 10b4, 10b5 and 10b6 form a uniform and even osculating plane 10d on the print base 10a together with the resist layer 10c. The osculating plane 10d is contacted with the contactor 11.

The contactor 11 is provided with a first contact maker 11d disposed to be contacted slidingly with the first conductive part 10b4, a second contact maker 11e connected electrically with the first contact maker 11d and disposed to be contacted slidingly with the second conductive parts 10b5, and a third contact maker 11f connected electrically with the first and the second contact makers 11d and 11e and disposed to be contacted slidingly with the third conductive parts 10b6.

The respective contact makers 11d, 11e and 11f of the contactor 11 are formed in one body from conductive resilient material. The contactor 11 forms a conductive path and secured to a disc-shaped rotor 15 made of insulating material and fixed to the output shaft 5, whereby the first contact maker 11d, the second contact maker 11e and the third contact maker 11f are contacted slidingly with the osculating plane 10d of the plate 10 secured to the gear cover 2c by the respective elastic force according to the rotation of the output shaft 5.

When the output shaft 5 rotates according to the rotation of the armature 3, the contactor 11 rotates together with the rotor 15 and the second contact maker 11e repeats contact with the second conductive parts 10b5 on the osculating plane 10d intermittently. Accordingly, a first pulse signal is generated between the second terminal 13 connected with the second conductive parts 10b5 and the first terminal 12 connected with the ring-shaped first conductive part 10b4 which is always contacted with the first contact maker 11d of the contactor 11 by applying voltage between the first and second terminals 12 and 13. At the same time, the third contact maker 11f repeats contact with the third conductive parts 10b6 intermittently, therefore a second pulse signal is generated between the third terminal 14 connected with the third conductive parts 10b5 and the first terminal 12 connected with the ring-shaped first conductive part 10b4 by applying voltage between the first and third terminals 12 and 14. Also in this case, there is a phase difference equivalent to one-half of the pulse width between the first pulse signal generated through the second terminal 13 connected with the second conductive parts 10b5 and the second pulse signal generated through the third terminal 14 connected with the third conductive parts 10b6 because of the deflection angles θ5 of 4.5 deg existing between the second and the third conductive parts 10b5 and 10b6 similarly to the aforementioned embodiment.

Figure 9:
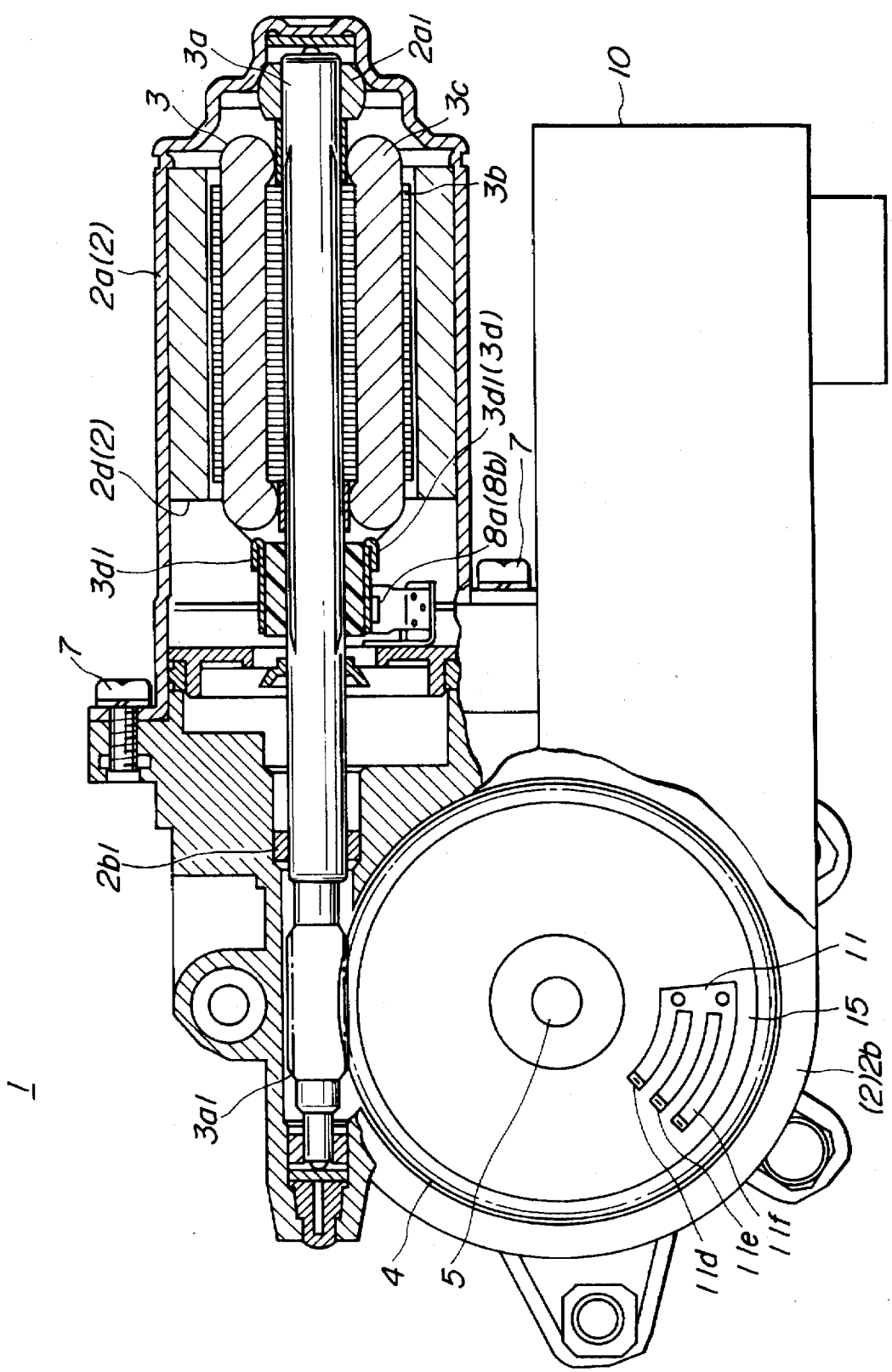
FIG. 9 is a partially sectional front view illustrating the second embodiment of the electric motor according to this invention.
Figure 12:
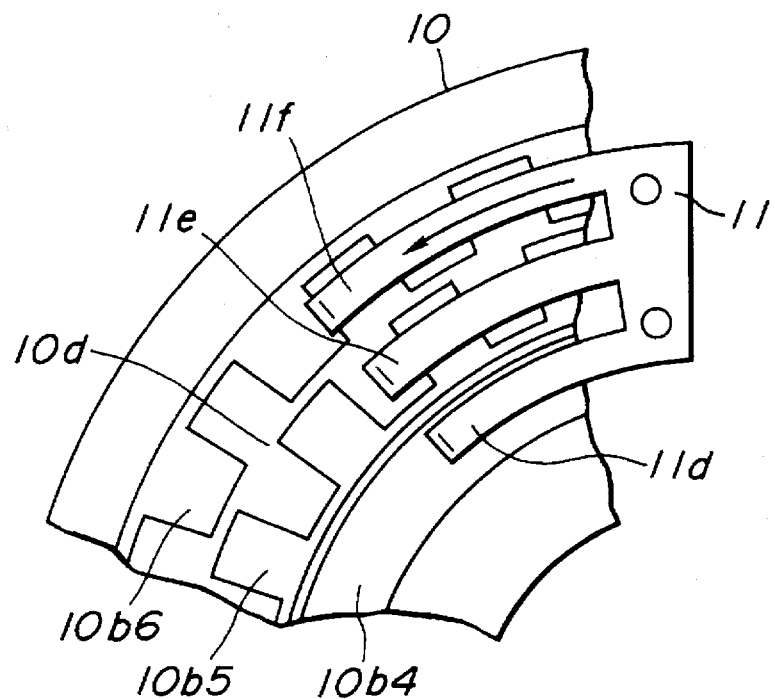
FIGS. 12 and 13 are schematic illustration showing contact between a contactor and conductive parts of the plate in the electric motor shown in FIG. 9.

Namely, when the output shaft 5 rotates in the clockwise direction (forward rotation) in FIG. 9, the contactor 11 rotates in the anticlockwise direction together with the rotor 15 fixed to the output shaft 5 in FIG. 12 which is a rear side view of FIG. 9. In this time, the third contact maker 11f of the contactor 11 is contacted with the third conductive parts 10b6 and separates from the third conductive parts 10b6 always before the second contact maker 11e is contacted with the second conductive parts 10b5 and separates from the second conductive parts 10b5, as shown in FIG. 12, therefore a delay of pulse phase corresponding to one-half of the pulse width is always observed in the first pulse signal generated through the second terminal 13 against the second pulse signal generated through the third terminal 14.

Figure 13:
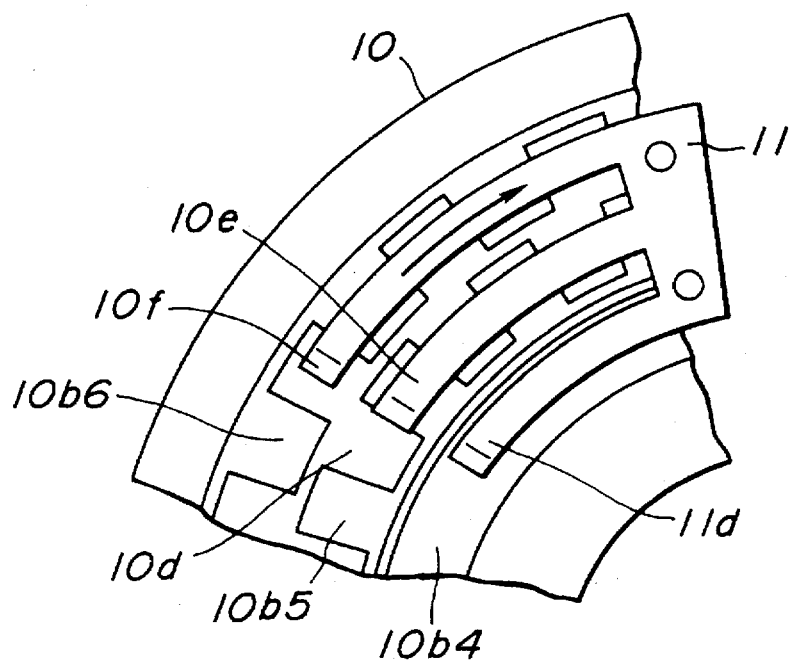

Contrary to above, when the output shaft 5 rotates in the anticlockwise direction (reverse rotation) in FIG. 9, the contactor 11 rotates in the clockwise direction together with the rotor 15 fixed to the output shaft 5 in FIG. 13 which is a rear side views of FIG. 9. As shown in FIG. 3, the second contact maker 11e of the contactor 11 is contacted with the second conductive parts 10b5 and separates from them always before the third contact maker 11f of the contactor 11 is contacted with the third conductive parts 10b6 and separates from them, accordingly, a delay of pulse phase equivalent to one-half of the pulse width is always observed in the second pulse signal generated through the third terminal 14 against the first pulse signal generated through the second terminal 13.

In such a manner, it is possible to decide the rotational direction of the rotor 15, that is the output shaft 5 by detecting the delay of pulse phase in the first pulse signal or the second pulse signal also in the electric motor 1 according to this embodiment.

Also in the electric motor 1 according to this invention, the first contact maker 11d, the second contact maker 11e and the third contact maker 11f of the contactor 11 are contacted securely with the osculating plane 10d of the plate 10 by the elastic force of the respective contact makers and the osculating plane 10d is formed in a smooth and even face by the respective conductive parts 10b4, 10b5, 10b6 and the resist layer 10c, therefore it is possible to obtain the stabilized and regular pulse signals as that the rotation of the output shaft 5 is detected without misunderstanding even if the rotor 15 secured with the contactor 11 oscillates according to the rotation of the output shaft 5. Furthermore, it is possible to reduce noise and abrasion of the contact makers 11d, 11e and 11f, and the duty cycle of the pulse signal generated from the pulse signal generator 6 is not influenced very much by the abrasion of the contact makers 10d, 10e and 10f even if these contact makers 10d, 10e and 10f are worn for a long time of operation similarly to the electric motor 1 according to the aforementioned embodiment.

The plate 10 may be formed by molding insulating resin together with the conductor plate 10b having the respective conductive pert 10b4, 10b5 and 10b6 through the insert moulding process as shown in FIG. 8.

Figure 7:
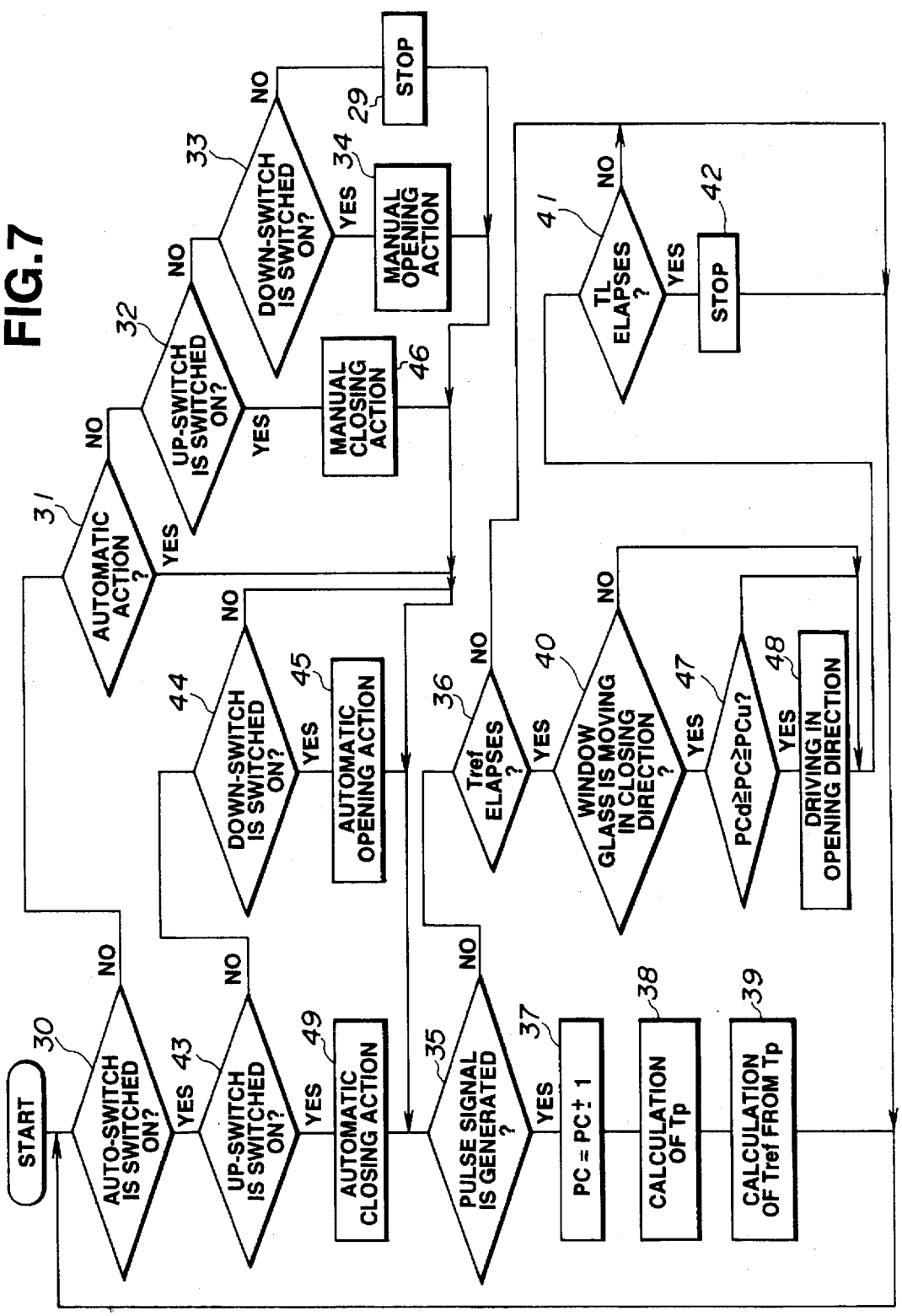
FIG. 7 is a flow chart illustrating a control of the power window apparatus shown in FIG. 6.

The electric motor 1 may be also applied to the power window apparatus 80 shown in FIG. 6, for example, and used for actuating the window glass 82 according to instructions of the controller 50 similarly to the aforementioned embodiment as shown in FIG. 7.

As mentioned above, in the electric motor according to this invention, the pulse signal generator means is composed of the plate and the contactor, so designed as to generate the pulse signal on basis of the contact between the contactor and the conductor plate disposed on the plate. Therefore, excellent effects can be obtained in that the pulse signal is independent of the sway or osculation of the plate or the contactor and it is possible to detect the rotation of the output shaft very accurately, and the high accuracy is not required for disposing the plate and the contactor so that the electric motor becomes easy to be assembled. Furthermore, it is possible to improve the resolution of the pulse signal very easily by decreasing the distance between the conductive parts of the conductor plate.

In the electric motor provided with the pulse signal generator means composed of the plate having the conductor plate provided with the first conductive part, the second conductive parts, third conductive parts, and the contactor provided with the first contact maker to be contacted with the first conductive part, the second contact maker to be contacted with the second conductive parts, the third contact maker to be contacted with the third conductive parts of the conductor plate, it is possible to obtain two pulse signals having a phase difference therebetween according to the rotation of the output shaft and possible to detect the rotational direction of the output shaft on basis of the phase difference between the two pulse signals.

Furthermore, the plate is formed with the osculating plane having the smooth and even surface through the printing method or the insert moulding process, accordingly an excellent effect can be obtained in that it is possible to reduce noise and abrasion of the contact makers of the contactor, and possible to minimize the influence by the abrasion of the contact makers even if the contact makers are worn for a long time.

What is claimed is:

1. An electric motor comprising:

an armature rotating on an inner side of a magnet disposed on an inner peripheral face of a motor yoke;

an output shaft rotating according to transmission of the rotary power of the armature; and a pulse signal generator means disposed in a casing for generating a pulse signal according to the rotation of the output shaft;

wherein said pulse signal generator means is composed of a plate secured to the output shaft and a contactor secured to the casing;

said plate of the pulse signal generator means is provided with a conductor plate having a ring-shaped first conductive part, second conductive parts of predetermined angular widths formed continuously from said first conductive part and disposed annularly with predetermined spaces and third conductive parts of predetermined angular widths, formed continuously from said first and second conductive parts and disposed annularly with predetermined spaces at positions shifted from said second conductive parts as much as predetermined deflection angles; and said contactor of the pulse generator means is provided with a first contact maker disposed to be contacted slidingly with said first conductive part of the conductor plate, a second contact maker isolated from said first contact maker and disposed to be contacted slidingly with said second conductive parts of the conductor plate, and a third contact maker isolated from said first and second contact makers and disposed to be contacted slidingly with said third conductive parts of the conductor plate of the plate.

2. An electric motor comprising:

an armature rotating on an inner side of a magnet disposed on an inner peripheral face of a motor yoke;

an output shaft rotating according to transmission of the rotary power of the armature; and a pulse signal generator means disposed in a casing for generating a pulse signal according to the rotation of the output shaft;

wherein said pulse signal generator means is composed of a plate secured to the casing and a contactor secured to the output shaft;

said plate of the pulse signal generator means is provided with a conductor plate having a ring-shaped first conductive part, second conductive parts of predetermined angular widths connected electrically with each other, isolated from said first conductive part and disposed annularly with predetermined spaces, and third conductive parts of predetermined angular widths, connected electrically with each other, isolated from said first and second conductive parts and disposed annularly with predetermined spaces at positions shifted from said second conductive parts as much as predetermined deflection angles; and said contactor of the pulse generator means is provided with a first contact maker disposed to be contacted slidingly with said first conductive part of the conductor plate, a second contact maker connected electrically with said first contact maker and disposed to be contacted slidingly with said second conductive parts of the conductor plate, and a third contact maker connected electrically with said first and second contact makers and disposed to be contacted slidingly with said third conductive parts of the conductor plate of the plate.

3. An electric motor as set forth in claim 1, wherein said plate of the pulse generator means is formed of a disc-shaped print base made of insulating resin and the conductor plate disposed on said print base together with a non-conductive resistive layer, and is formed with an oscillating plane having a smooth face to be contacted slidingly with said contactor of the pulse generator means.

4. An electric motor as set forth in claim 1, wherein said plate of the pulse generator means is formed from insulating resin together with the conductor plate through insert moulding process and formed with an oscillating plane having a smooth face to be contacted slidingly with said contactor of the pulse generator means.

5. An electric motor as set forth in claim 2, wherein said plate of the pulse generator means is formed of a disc-shaped print base made of insulating resin and the conductor plate disposed on said print base together with a non-conductive resistance layer, and is formed with an oscillating plane having a smooth face to be contacted slidingly with said contactor of the pulse generator means.

6. An electric motor as set forth in claim 2, wherein said plate of the pulse generator means is formed from insulating resin together with the conductor plate through insert moulding process and formed with an oscillating plane having a smooth face to be contacted slidingly with said contactor of the pulse generator means.

7. An electric motor used for a power window apparatus of a motor vehicle, comprising:

a)
a casing having;
a motor casing as a yoke;
a gear casing securing to an open end of said motor casing; and
a gear cover covering said gear casing, b)
a pair of magnets disposed on an inner peripheral surface of said motor casing, c)
an armature disposed rotatably between said pair of magnets in said motor casing, including:
an armature shaft;
an armature core secured on said armature shaft;
an armature coil wound around said armature core; and
a commutator connected to said armature coil and fixed on said armature shaft,
said armature shaft being formed with a worm disposed in said gear casing, d)
a worm wheel disposed in said gear casing and meshed with the worm formed on the armature shaft of said armature, including:
an elastic damper made of elastic material; and
an output shaft rotatably supported by said gear casing and connected with the worm wheel through said elastic damper, e)
a pulse signal generator disposed between said gear casing and said gear cover, having:

a disc-shaped base connected with said worm wheel;
a conductor plate formed on said disc-shaped base; and
a conductor plate including first, second and third conductive members,
said first conductive member being formed in a ring shape on said disc-shaped base,
said second conductive member being formed from and extending radially from the circumference of the ring-shaped first conductive member,
the second conductive member having a plurality of first conductive pieces of predetermined angular width $\theta 1$,
the first conductive pieces being disposed annularly with predetermined spacing $\theta 2$,
said third conductive member being formed from and extending radially from an outer side of the respective second conductive member, the third conductive member having a plurality of second conductive pieces of predetermined angular width $\theta 3$ and the second conductive pieces being disposed annularly with predetermined equal spacing $\theta 4$ similar to the first conductive pieces at positions shifted annularly from the respective first conductive pieces as much as predetermined off set angle $\theta 5$,
said contactor being provided with a first contact maker disposed to be contacted slidingly with the first conductive member, a second contact maker isolated from the first contact maker and disposed to be contacted slidingly with the second conductive member, and a third contact maker isolated from the first and the second contact makers and disposed to be contacted slidingly with the third conductive member.

8. An electric motor as set forth in claim 7, wherein angular width $\theta 1$ of the first conductive pieces of said second conductive member is equal to spacing $\theta 2$, and angular width $\theta 3$ of the first conductive pieces of said third conductive member is equal to spacing $\theta 4$.

9. An electric motor as set forth in claim 8, wherein angular width $\theta 1$ of the first conductive pieces of said second conductive member is equal to angular width $\theta 3$ of the first conductive pieces of said third conductive member.

10. An electric motor as set forth in claim 9, wherein predetermined offset angle $\theta 5$ is equal to one half of angular width $\theta 1$.

11. An electric motor as set forth in claim 7, wherein said conductor plate of the pulse signal generator is formed on a resinous disc-shaped base through insert moulding process.

12. An electric motor as set forth in claim 7, wherein said disc-shaped base of said pulse signal generator is secured on said output shaft of said worm wheel, and said contactor of said pulse signal generator is secured on the gear cover of said casing.

13. An electric motor as set forth in claim 7, wherein said disc-shaped base of said pulse signal generator is secured on said casing, and said contactor of said pulse signal generator is secured on a rotor fixed on said output shaft of said worm wheel.

14. An electric motor used for a power window apparatus of a motor vehicle, comprising:

a)
a casing having;
a motor casing as a yoke;
a gear casing securing to an open end of said motor casing; and a gear cover covering said gear casing, b) a pair of magnets disposed on an inner peripheral surface of said motor casing, c) an armature disposed rotatably between said pair of magnets in said motor casing, including:
  an armature shaft;
  an armature core secured on said armature shaft;
  an armature coil wound around said armature core; and
  a commutator connected to said armature coil and fixed on said armature shaft,
  said armature shaft being formed with a worm disposed in said gear casing, d) a worm wheel disposed in said gear casing and meshed with the worm formed on the armature shaft of said armature, including:
  an elastic damper made of elastic material; and
  an output shaft rotatably supported by said gear casing and connected with the worm wheel through said elastic damper, e) a pulse signal generator disposed between said gear casing and said gear cover, having:
  a disc-shaped base connected with said worm wheel;
  a contactor made of conductive resilient material and contacting said conductor plate,
  said conductor plate including first, second and third conductive members,
  said first conductive member being formed in a ring shape on said disc-shaped base,
  said second conductive member being formed from and extending radially from the circumference of the ring-shaped first conductive member,
  the second conductive member having a plurality of first conductive pieces of predetermined angular width $\theta 1$,
  the first conductive pieces being disposed annularly with predetermined spacing $\theta 2$,
  said third conductive member being formed from and extending radially from an outer side of the respective second conductive member, the third conductive member having a plurality of second conductive pieces of predetermined angular width $\theta 3$ and the second conductive pieces being disposed annularly with predetermined equal spacing $\theta 4$ similar to the first conductive pieces at positions shifted annularly from the respective first conductive pieces as much as predetermined offset angle $\theta 5$,
  said contactor being provided with a first contact maker disposed to be contacted slidingly with the first conductive member, a second contact maker isolated from the first contact maker and disposed to be contacted slidingly with the second conductive member, and a third contact maker isolated from the first and the second contact makers and disposed to be contacted slidingly with the third conductive member.

15. An electric motor as set forth in claim 14, wherein angular width $\theta 1$ of the first conductive pieces of said second conductive member is equal to spacing $\theta 2$, and angular width $\theta 3$ of the first conductive pieces of said third conductive member is equal to spacing $\theta 4$.

16. An electric motor as set forth in claim 15, wherein angular width $\theta 1$ of the first conductive pieces of said second conductive member is equal to angular width $\theta 3$ of the first conductive pieces of said third conductive member.

17. An electric motor as set forth in claim 16, wherein predetermined offset angle $\theta 5$ is equal to one half of angular width $\theta 1$.

18. An electric motor as set forth in claim 14, wherein said conductor plate of the pulse signal generator is formed on a resinous disc-shaped base through insert moulding process.

19. An electric motor as set forth in claim 14, wherein said disc-shaped base of said pulse signal generator is secured on said output shaft of said worm wheel, and said contactor of said pulse signal generator is secured on the gear cover of said casing.

* * * * *